Dec. 8, 1959  A. H. LOEHR  2,916,199
CENTRIFUGAL FAN WHEELS
Filed April 7, 1958

Inventor:
Albert H. Loehr,
by Robert T. Palmer
Attorney

United States Patent Office 2,916,199
Patented Dec. 8, 1959

2,916,199

CENTRIFUGAL FAN WHEELS

Albert H. Loehr, Westwood, Mass., assignor to Westinghouse Electric Corporation, East Pittsburgh, Pa., a corporation of Pennsylvania Application April 7, 1958, Serial No. 726,835

1 Claim. (Cl. 230—134)

This invention relates to centrifugal fan wheels having airfoil blades welded to side and back or center plates, and has as an object to increase the strength of such constructions.

Centrifugal fan wheels having air foil blades are widely used where maximum efficiency of operation is desired. Such airfoil blades are usually hollow for reduction of weight and centrifugal stress. In the past, such blades have had their edges where, in a single inlet wheel, they contact the side and back plates, and where, in a double inlet wheel, they contact the side and cenetr plates, bevelled at angles of about 45° to provide passages triangular in section, for receiving the weld metal. In high pressure fans, the strengths of such welds has been insufficient, resulting in many blade failures. Also, since the blade metal at the apex of such a passage was very thin, it often melted during the welding, and permitted weld metal slag to fall into the hollow blades.

My invention overcomes the disadvantages of such former welds by turning the support plate contacting edges of the holow blades inwardly to form, with the supporting plates, weld metal receiving passages, triangular in section, several times larger than the prior weld metal receiving passages. The edges of the blades where they contact the supporting plates may be beveled to form flat surfaces parallel to the surfaces of the plates they contact, providing relatively wide back-up surfaces which prevent the entry of slag into the blades.

My invention will now be described with reference to the annexed drawings, of which:

Figure 1:
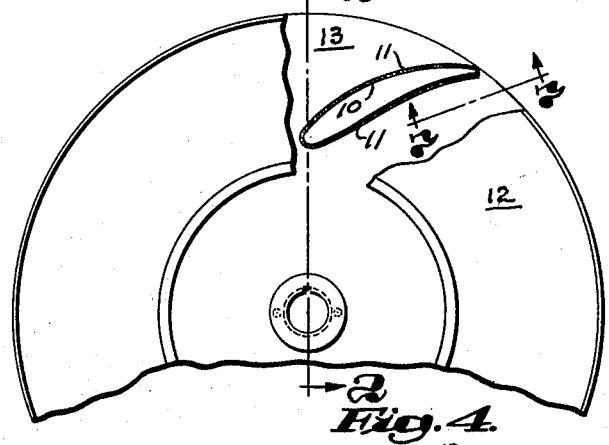
Fig. 1 is a fragmentary side view, with a portion of its side plate removed to show an airfoil blade welded to its back plate, of a single inlet, centrifugal fan wheel embodying my invention.
Figure 2:
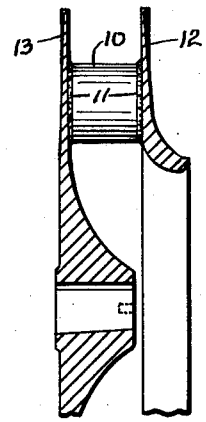
Fig. 2 is a section along the line 2—2 of Fig. 1.

Figs. 1 and 2 show a hollow airfoil blade 10 welded at 11 to a side plate 12 and to a back plate 13 of a single-inlet, centrifugal fan wheel. The wheel is designed to rotate in a counter-clockwise direction so that the convex side of the blade is its driving side, and the concave side of the blade is its trailing face.

Figure 3:
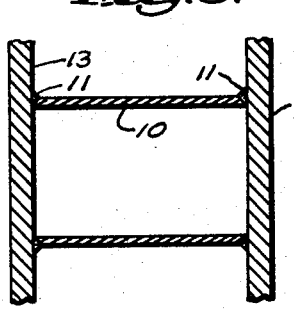
Fig. 3 is an enlarged section through a hollow blade, and fragmentary views of a side and back plate to which the blade is welded, and shows a prior construction.
Figure 4:
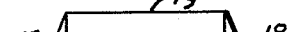
Fig. 4 is a plan view of a flat blade blank showing how it is prepared according to my invention.

Fig. 3 shows the old construction in which a blade where it contacts a side plate 12 and a back plate 13, has its edges bevelled at an angle of 45° to provide a passage, triangular in section, where the weld metal 11 can enter. The weld metal is relatively small, and the blade metal at the apex of each passage is reduced substantially to a knife edge. During welding such knife edges often melt and permit weld slag to enter a blade.

Figure 8:
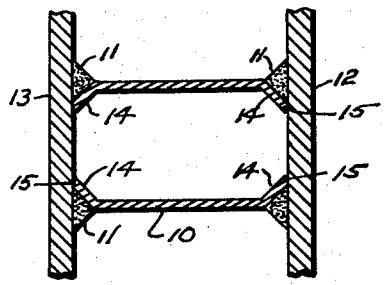
Fig. 8 is an enlarged section corresponding to Fig. 3 but showing a construction embodying my invention.
Figure 9:
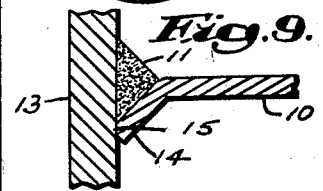
Fig. 9 is an enlarged, fragmentary view, in section, of a blade welded to a back plate according to my invention, and shows the flat beveled surface of the blade where it contacts the back plate.

Figs. 8 and 9 show one embodiment of my invention in which the end portions of the driving and trailing sides of a blade are bent inwardly to form flanges 14 which extend at angles of 45° to the side plate 12 and to the back plate 13, and which form with the side and back plates, relatively large passages, triangular in section, in which the weld metal 11 enters. The edges of the two sides of the blade where they contact the plates 12 and 13 are beveled to form flat, plate contacting surfaces 15 having sufficient depth to prevent their being melted to permit entry of slag into the blade.

Figs. 4–7 show how the blade is formed according to my invention. A flat blade blank 16 has its opposite edges along its length notched inwardly at 17 where the nose of the formed blade occurs. The end of the blank 16 which forms the tip of the trailing side of the blade after forming is beveled at 18 towards its tip 19. The longitudinal edges of the blank are then bent along the lines 20 to form the flanges 14. The notches 17 extend inwardly to adjacent the lines 20.

Figure 6:
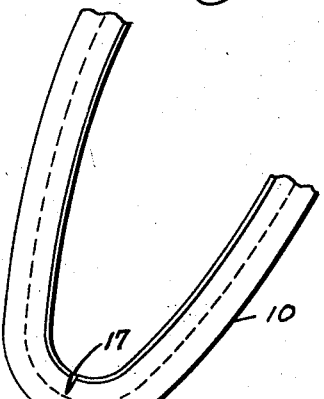
Fig. 6 is an enlarged view of the nose end of a blade embodying my invention, after forming around a mandrel.

The blank is then formed around an airfoil shaped mandrel as disclosed in the copending application, Serial No. 537,365 of F. R. Benedict and A. F. Utakis, filed September 29, 1955, now abandoned. Fig. 6 shows how the notches 17 are closed after the blade is formed. The notches 17 remove metal which otherwise would prevent the formation of the desired weld metal receiving passage at the blade nose.

Figure 7:
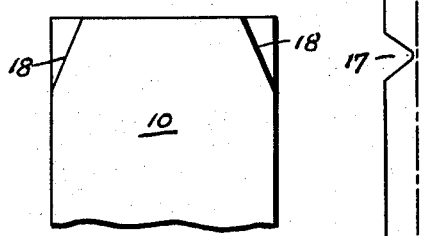
Fig. 7 is an enlarged view taken along the line 7—7 of Fig. 1.

Fig. 7 shows how each flange 14 of the trailing side of the blade is beveled away towards its tip for clearing the corresponding flange 14 of the driving side of the blade, and permitting the tip of the blade to have the desired small depth.

While Fig. 1, for simplicity of illustration, shows but a single blade 10, a plurality of equally spaced blades 10, usually ten in number would be provided.

A double-inlet fan has a center plate which acts as a back plate for each fan section. In the annexed claims, "back plate" should be interpreted as "center plate" where the fan is a double-inlet fan.

Figure 5:
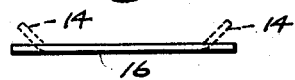
Fig. 5 is an end view of the blank of Fig. 4, showing in dashed outline how the sides of the blade blank are bent according to my invention.

In the annexed claim, "heights" mean the distances the flanged end portions of the blades extend outwardly from the flat sides of the blades as shown by Fig. 5.

What I claim is:

A centrifugal fan wheel having a side plate, a back plate, a hollow airfoil blade having a rounded nose, extending between said plates, the driving and trailing sides of said blade having at each of said plates, flanged end portions which converge towards said plates and form with each of said plates a pair of weld metal receiving passages triangular in section, said flanged end portions of one of said sides extending with uniform heights from the center of said nose to the tip of said one side, said flanged end portions of the other of said sides extending with uniform heights from said center of said nose to points adjacent the tip of said other side and decreasing in heights from said points to zero heights at said tip of said other side for clearing said flanged end portions of said one side at and adjacent said tips, and weld metal in said passages securing said blade to said plates.

References Cited in the file of this patent

UNITED STATES PATENTS

| | | |
|---|---|---|
| 1,893,201 | Van Rijswijk | Dec. 4, 1934 |
| 2,691,214 | Schnell et al. | Oct. 12, 1954 |

FOREIGN PATENTS

| | | |
|---|---|---|
| 608,703 | Great Britain | Sept. 20, 1948 |
| 720,956 | Great Britain | Dec. 29, 1954 |